(12) United States Patent
Arsanjani et al.

(10) Patent No.: US 11,575,755 B1
(45) Date of Patent: *Feb. 7, 2023

(54) AGGREGATED CONTEXT INFORMATION FOR DATA COMMUNICATIONS BETWEEN CLIENT-SPECIFIC SERVERS AND DATA-CENTER COMMUNICATIONS PROVIDERS

(71) Applicant: 8x8, Inc., San Jose, CA (US)

(72) Inventors: Ali Arsanjani, Campbell, CA (US);
Bryan R. Martin, Campbell, CA (US);
Manu Mukerji, Campbell, CA (US);
Venkat Nagaswamy, Campbell, CA (US); Marshall Lincoln, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 16/218,091

(22) Filed: Dec. 12, 2018

(51) Int. Cl.
| | |
|---|---|
| *G06F 16/00* | (2019.01) |
| *H04L 67/141* | (2022.01) |
| *G06F 16/242* | (2019.01) |
| *G06F 16/2455* | (2019.01) |
| *G06F 16/26* | (2019.01) |
| *H04L 67/306* | (2022.01) |
| *G06F 40/30* | (2020.01) |
| *H04L 67/1097* | (2022.01) |

(52) U.S. Cl.
CPC ......... *H04L 67/141* (2013.01); *G06F 16/244* (2019.01); *G06F 16/24556* (2019.01); *G06F 16/26* (2019.01); *G06F 40/30* (2020.01); *H04L 67/306* (2013.01); *H04L 67/1097* (2013.01)

(58) Field of Classification Search
CPC .. G06F 16/24556; G06F 16/26; G06F 16/244; G06F 40/30; H04L 67/141; H04L 67/1097; G04L 67/306
USPC ......................................................... 707/769
See application file for complete search history.

(56) References Cited

U.S. PATENT DOCUMENTS

| | | |
|---|---|---|
| 7,979,840 B2 | 7/2011 | Zhang et al. |
| 8,316,347 B2 | 11/2012 | Arsanjani et al. |
| (Continued) | | |

*Primary Examiner* — Monica M Pyo
(74) *Attorney, Agent, or Firm* — Crawford Maunu PLLC

(57) ABSTRACT

Certain aspects of the disclosure are directed to providing aggregated context information in a data communications network. According to a specific example, a data communications server can operate to provide user-data communications sessions each involving a client-specific endpoint device and another participating endpoint device, where the client-specific endpoint device is associated with a client-entity among a plurality of remotely-situated client entities. User-data communications between the client-specific endpoint device and the other participating endpoint device can be retrieved from a plurality of disparate interconnected data communications systems, where the data communications systems each provide at least one data communications service to the client entity on a subscription basis. Context information for each respective user-data communication between the client-specific endpoint device and the other participating endpoint device can be aggregated and displayed in a disparate-system data room, where the aggregated context information includes an indication of the context for each user-data communication.

17 Claims, 6 Drawing Sheets

(56) References Cited

U.S. PATENT DOCUMENTS

| | | | |
|---|---|---|---|
| 8,332,813 B2 | 12/2012 | Arasanjani et al. | |
| 8,739,111 B2 | 5/2014 | Allam et al. | |
| 8,874,755 B1 | 10/2014 | Deklich et al. | |
| 9,171,319 B2 | 10/2015 | Qu et al. | |
| 2003/0187868 A1* | 10/2003 | Igarashi | G06F 9/4806 |
| 2004/0122245 A1 | 6/2004 | Franks | |
| 2008/0027784 A1 | 1/2008 | Ang et al. | |
| 2009/0254572 A1* | 10/2009 | Redlich | G06Q 10/06 |
| 2010/0318548 A1* | 12/2010 | Mayr | G16H 10/60 707/759 |
| 2016/0036869 A1* | 2/2016 | Logan | H04M 3/5141 379/265.09 |
| 2018/0309708 A1* | 10/2018 | Potvin | G06Q 10/10 |
| 2018/0324041 A1 | 11/2018 | Deklich et al. | |

* cited by examiner

AGGREGATED CONTEXT INFORMATION FOR DATA COMMUNICATIONS BETWEEN CLIENT-SPECIFIC SERVERS AND DATA-CENTER COMMUNICATIONS PROVIDERS

OVERVIEW

Aspects of various embodiments are directed to providing aggregated context aggregation for data communications between client-specific servers and data-center communications providers. Particular embodiments are directed toward methods for use in communications systems employing a data communications server operated by a communications provider, where the data communications server is on the data communications provider side, to provide data communications services to a multitude of client entities. A data communications endpoint device can use a broadband Internet connection to connect to a data communications server that is managed by a data communications service provider. The data communications server can handle communication routing and provide other data communications services for the data communications endpoint device. Such server(s) operating on behalf of data-communications service providers, provide users access to managed databases and/or services over the high throughput mediums. Non-limiting examples of data-communications service providers include ISPs (Internet Service Providers) and various other companies which provide Internet-related services such as email and search-engine services (Google, Yahoo, Microsoft, etc.) and more specialized computer-based services such as staffing software service, information technology management service, and/or customer relationship management services.

Computing servers are increasingly being used to provide various data communications services over a network including, but not limited to, routing of Voice over Internet Protocol (VoIP) communications and/or for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

SUMMARY

Various example embodiments are directed to issues such as those addressed above and/or others which may become apparent from the following disclosure concerning systems and methods for providing aggregated context aggregation for data communications between client-specific servers and data-center communications providers.

Embodiments are directed toward methods for use in communications systems employing a data communications server operated by a communications provider, where the data communications server is on the data communications provider side, to provide data communications services to a multitude of client entities. In such contexts, the data communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues.

Users of a server-based communications system often use a plurality of communication services to communicate with clients and other professionals and to carry out various tasks. For example, users may use a private network application to generate work products, a cloud-based application to manage service issues, another cloud-based application to manage direct communications such as email and chat messages, and yet another cloud-based application to manage financial matters such as billing and invoicing. In many instances, it may be beneficial for users of the server-based system to compile a list of recent interactions with a client and/or other professional to improve subsequent interactions with the client or professional.

Consistent with embodiments of the present disclosure, in a communications system involving a data communications server and a client-managed server, aggregated context information for data communications between the data communications server and the client-managed server can be provided. In such embodiments, the data communications server operates to provide user-data communications sessions each involving a client-specific endpoint device and another participating endpoint device, where the client-specific endpoint device is associated with a client-entity among a plurality of remotely-situated client entities each respectively configured and arranged to interface with the data communications server. The data communications server further operates to retrieve from a plurality of disparate interconnected data communications systems, user-data communications between the client-specific endpoint device and the other participating endpoint device during a first time period, where the data communications systems each provide at least one data communications service to the client entity on a subscription basis The data communications server can aggregate context information for each respective user-data communication between the client-specific endpoint device and the other participating endpoint device during the first time period, where the context corresponds to at least one communications-specific characteristic. Thereby, the data communications server can display in a disparate-system data room, the aggregated context information of the user-data communications between the client-specific endpoint device and the other participating endpoint device during a first time period, the aggregated context information including an indication of the context for each respective user-data communication.

In a particular example embodiment, an apparatus comprising a client-specific communications server and a management circuit can provide the aggregated context information. The client-specific communications server can be configured and arranged to route data communications for a plurality of end-users having respective data communication devices, and to interface with a data-center communications server providing data communications services to a plurality of remotely-situated client entities on a subscription basis, each client entity respectively configured and arranged to interface with the data-center communications server. The management circuit can be configured and arranged to interface with the client-specific communications server and to store context information from a plurality of interconnected data communications systems where the data communications systems each provide at least one of the data communications services to the client entity. The client-specific communications server can be configured and arranged to provide user-data communications sessions each involving a client-specific endpoint device and another participating endpoint device during a first time period, where the client-specific endpoint device is associated with the client entity. The client-specific communications server can then determine a context for each respective user-data communication between the client-specific endpoint device and the other participating endpoint device during the first time period, and provide to the client-specific endpoint device, aggregated context information of the user-data communications between the client-specific endpoint device and the other participating endpoint device during a first time period, the aggregated context information including an indication of the context for each respective user-data communication.

In an additional embodiment, an apparatus comprising a management circuit and a data-center communications server can provide the aggregated context information. In such example embodiments, the management circuit can be configured and arranged to correlate identifiable aspects of user-data communications involving at least one client entity among a plurality of remotely-situated client entities with particular context information, each of the plurality of remotely-situated client entities respectively configured and arranged to provide data communications services for a plurality of end-users having respective data communication devices including circuitry to facilitate the data communications service. The data-center communications server can be configured and arranged to interface with the plurality of remotely-situated client entities and to provide the data communications services to the plurality of remotely-situated client entities on a subscription basis. The data-center communications server can be configured and arranged to retrieve from a plurality of interconnected data communications systems, a plurality of user-data communications between the client-specific endpoint device and the other participating endpoint device, where the data communications systems each provide at least one of the data communications services to the client entity. The data-center communications server can determine a context for each respective user-data communications based on a comparison of identifiable aspects of the user-data communication and the context information. Moreover, the data-center communications server can provide to the client-specific endpoint device, access to a virtual room including the context information of the plurality of user-data communications.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
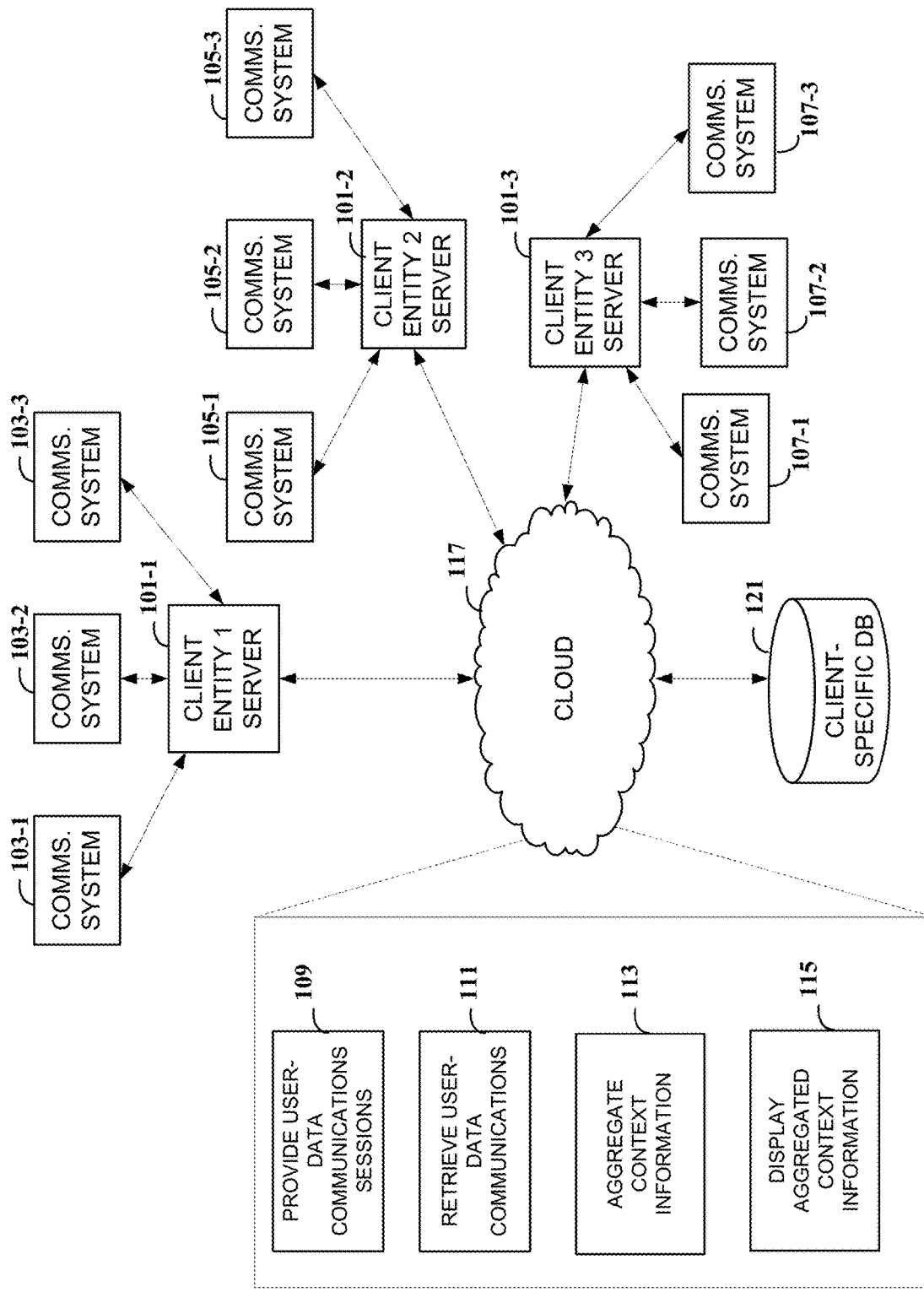
FIG. 1 illustrates a block diagram of an example system for providing aggregated context information in a data communications network, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving context aggregation in a data communications network. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Embodiments are directed toward methods for use in communications systems employing a data communications server operated by a communications provider, where the data communications server is on the data communications provider side, to provide data communications services to a multitude of client entities. For instance, the data communications server can provide data communications sessions each involving a client-specific endpoint device and another participating endpoint device, where the client-specific endpoint device is associated with a client-entity among the plurality of remotely-situated client entities. In such contexts, the data communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data communications session can include transmission and receipt of data communications between at least two endpoint devices, as hosted (e.g., provided) by the data communications server.

Users of a server-based communications system often use a plurality of communication services to communicate with clients and other professionals and to carry out various tasks. For example, users may use a private network application to generate work products, a cloud-based application to manage service issues, another cloud-based application to manage direct communications such as email and chat messages, and yet another cloud-based application to manage financial matters such as billing and invoicing. In many instances, it may be beneficial for users of the server-based system to compile a list of recent interactions with a client and/or other professional to improve subsequent interactions with the client or professional. For instance, Bob Smith, a sales representative that uses a Voice over Internet Protocol (VoIP) system, can interact with customer Sally Johnson. When contacting Sally Johnson to inquire about the status of her account and to share a promotional opportunity available, Bob Smith may wish to have information about Sally's recent technical calls which indicate she has had technical difficulty, and he may wish to have readily available his most recent email communications with Sally.

The communication services may be provided in a virtual office environment including, for example, virtual desktops, word processing, scheduling service, transcription services, and/or online conferences and file sharing. A virtual office environment can provide a number of different services to end users. Various embodiments of the present disclosure allow users of a virtual office environment to view aggregated context information from a plurality of disparate interconnected data communications systems in a common user interface (e.g., a disparate-system data room).

As described herein, disparate interconnected data communications systems refer to and/or include data communications systems that include or comprise of fundamentally different data communications systems, and can use different and perhaps incompatible data storage and/or management processes.

In an additional illustration, a user of such server-based communications systems may utilize information from a plurality of data/management systems to interact with customers. For instance, Jeff Sample, an information technology (IT) technician may use an instant messaging service to communicate with clients that are having technical problems with a software application. Jeff Sample may also use an email service to communicate with clients as well as colleagues. Polly Hicks, a client of Jeff Sample, may send Jeff Sample an instant message requesting assistance with the software application. Jeff Sample may receive information regarding Polly Hicks from additional data or management systems in response to receipt of the message from Polly Hicks. For instance, in response to receipt of the instant message from Polly Hicks requesting IT support, a graphical user interface can display for Jeff Sample the previous email messages between him and Polly Hicks, invoices including the previous purchases made by Polly Hicks, and service tickets including notes from previous technical support requests from Polly Hicks. In such a manner, during his chat session with Polly Hicks, Jeff Sample can more quickly and efficiently assess Polly's technical needs without having to independently search multiple data or management systems during his chat session.

Yet further, it may be beneficial for Bob Smith and Jeff Sample to have an idea of how the recent interactions with Sally Johnson and Polly Hicks have gone. For example, when Bob Smith communicates with Sally Johnson, it may be beneficial for him to know that the relationship with Sally has become contentious as disputes have arisen over customer service issues. As another illustration, Jeff Sample may wish to know that Polly Hicks has been very pleased with her products and services, and has left a number of voicemails for sales representatives indicating that she wishes to add to her suite of existing products and services. In both situations, Bob Smith and Jeff Sample may benefit from an understanding of the context of the relationship with the other party so that they can best meet the needs of their client and best serve the company which they represent. Bob Smith would benefit from approaching communications with Sally Johnson with diplomacy and kindness, as the context of the business relationship with Sally Johnson has been negative. Jeff Sample would benefit from an understanding that Polly Hicks may purchase additional products and or services, as the context of the business relationship with Polly Hicks has been very positive.

Embodiments of the present disclosure are directed to techniques for using machine learning-based algorithms for context aggregation in a data communications network. This machine learning-based data communications routing system can provide a proactive monitoring solution to rapidly assess the content, classification, severity, sentiment and/or topic of data communications and create predictive models for received data communications. The proactive monitoring solution of the present disclosure can collect data into an event timeline, indicating events that transpired in previous data communications between a client entity and another party (e.g., individual and/or organization), as well the context of each of the previous data communications. The context can be representative of a sentiment between the client entity and the party, and/or the health of the relationship between the client entity and the party. By correlating aspects of the data communication, such as key words, phrases, tone, and/or other recognizable features and correlating such features with the overall context of the data communication, predictive models can be created for the extrapolation of future data communications between the parties.

Particularly, embodiments of the present disclosure are directed to techniques for context aggregation in a data communications network. A data communications server can provide user-data communications sessions each involving a client-specific endpoint device and another participating endpoint device, where the client-specific endpoint device is associated with a client-entity among a plurality of remotely-situated client entities each respectively configured and arranged to interface with the data communications server. Phrased another way, the user-data communications sessions can involve a representative of a client entity and another party. User-data communications between a client entity and the other party can be retrieved from a plurality of interconnected data communications systems. The user-data communications can include various data communications services over a network including, but not limited to, routing of VoIP communications and/or for providing communications services such as messaging, video conferencing, management of data communications exchange servers, packet switching, traffic management, website hosting, remote data storage, remote computing services, and management of virtual computing environments, among other examples. To determine the context of the relationship (e.g., the communications) between the client entity and the other party, machine learning and/or artificial intelligence can be implemented, such that with added use, thresholds for determining the context of the relationship become more defined with a larger data set.

As an illustration, user-data communications between a client entity and another party can be retrieved from the plurality of data communications systems. The communications can be historical communications corresponding with a defined period of time which has already passed. Each of the user-data communications retrieved corresponds with some form of communication between the client entity and a particular party, and each user-data communication retrieved can be retrieved from a data communications system providing at least one data communications service to the client entity. For instance, a client entity ABC company may have an email service, a chat service, a VoIP service, and a customer relationship management (CRM) service, each of which are provided by the data communications provider. One data communications system can manage the email service, another data communications system can manage the chat service, a different data communications system can manage the VoIP service, and yet another data communications system can manage the CRM service. Examples are not limited to the above mentioned data communications services/systems. In various example embodiments, each of the plurality of interconnected data communications systems can be a CRM system, an email communication system, a product sales system, a text-based communications system, a voice-based communications system, a technological support system, a data monitoring system, and/or external data sources associated with at least one of the client entity and the other party, among others.

To determine the context between ABC Company and client Sally Sample, communications between ABC Company and Sally Sample can be retrieved from each of these data communications systems. A context for each communication between ABC Company and Sally Sample can be determined. For instance, at least one communications-specific characteristic (e.g., a keyword, a phrase, a timestamp, a date, and/or a tone) can be identified for each respective user-data communication between the client entity and the other party during this time period, and the context for each respective user-data communication can be determined based on the identified communications-specific characteristic. A database of relationships between keyword, phrase, tone, topic, etc. and context can be maintained, such that a context can be determined for subsequent communications. In various embodiments, the communications-specific characteristic includes at least one of a keyword, a phrase, and a tone, and artificial intelligence may be used to associate the communications-specific characteristic with a context representative of the user-data communications between the client-specific endpoint device and the other participating endpoint device. The context of each respective user-data communication between the client entity (e.g., the client-specific endpoint device) and the other party (e.g., other participating endpoint device) during the first time period may be aggregated (e.g., combined) such that an overall context for the user-data communications between the client entity and the other party may be determined.

Subsequently, the aggregated context information of the user-data communications between the client-specific endpoint device and the other participating endpoint device, can be displayed in a disparate-system data room. As used herein, the term "disparate-system data room" refers to or includes circuitry having at least memory with data accessible for storing/refreshing an endpoint with corresponding data for review by a user or participant involved in the data communication. The disparate-system data room can include aggregated context information from a plurality of disparate (and perhaps interconnected) data communications systems in a common user interface (e.g., a disparate-system data room). The disparate-system data room (e.g., a virtual room presenting the aggregated context information) can include an indication of the context for each respective user-data communication. For instance, the disparate-system data room can include a plurality of display boxes, each associated with a different respective data communications system. Each display box can include information about previous user-data communications involving the client entity and the other party, as well as a representation of the context of the user-data communications. In various embodiments, the disparate-system data room can display the aggregated context between the client entity and the other party, such as in a contextual timeline of events. The contextual timeline of events can include a visual representation of different user-data communications between the client entity and the other party, as well as the context for each respective user-data communication. Additionally and/or alternatively, the contextual timeline of events can include a visual representation of the context for future user-data communications between the client entity and the other party.

The disparate-system data room including the aggregated context information can be displayed on a graphical user interface of the client-specific endpoint device. In various embodiments, the aggregated context information can be displayed on the endpoint device of the representative communicating with the other party. Additionally and/or alternatively, the aggregated context information can be displayed on an endpoint device of another representative of the client entity, such as a manager and/or supervisor overseeing activities of the client entity. In such a manner, various actions can be taken in response to identification of, and display of, the aggregated context information. For instance, the representative of the client entity may change service offerings provided to the other party and/or route communications to a different representative for ongoing support. As another illustration, responsive to As described herein, a contextual timeline of events can be created, including a visual representation of different user-data communications between the client entity and the other party over a period of time. In various embodiments, the contextual timeline of events can be displayed in real-time or near-real-time. As an illustration, the disparate-system data room can be displayed (such as via the client-specific endpoint device) on a graphical user interface of the client-specific endpoint device. Subsequently, at least one communications-specific characteristic (e.g., a keyword, a phrase, a tone, etc.) for user-data communications between the client-specific endpoint device and the other participating endpoint device can be identified during a second (e.g., subsequent) time period. Using the identified communications-specific characteristic, a context for each respective user-data communication between the client-specific endpoint device and the other participating endpoint device during the second time period can be determined. The aggregated context information, including the context for the user-data communications during the second time period, can be displayed in real-time on the graphical user interface of the client-specific endpoint device.

While examples herein are described with regards to analyzing speech characteristic parameters, it is noted that the user-data communications can correspond to user-generated audible messages or non-voice user-generated messages. For instance, user-generated audible messages can include voicemails and VoIP calls, and non-voice user-generated messages can include email messages, text messages, and/or chat messages, among others. In example embodiments in which the user-data communication includes a user-generated audible message, a transcript of the user-generated audible message can be created.

In a particular example embodiment, the user-data communications can include a voice communication. For instance, the voice communication can be addressed to a particular client among a plurality of remotely-situated client entities. Each respective client entity can be configured and arranged to interface with a data communications server providing data communications services on a subscription basis, and each of the plurality of remotely-situated client entities can be associated with a respective client-managed server. During the voice communication, speech characteristic parameters of the voice communication can be analyzed, and a context for the voice communication can be determined based on the analyzed speech characteristic parameters. In various example embodiments, the plurality of speech characteristic parameters can be identified by analyzing at least one of words and tones of voice communications previously received by the plurality of remotely-situated client entities, and correlating the plurality of speech characteristic parameters with a particular sentiment. A plurality of speech characteristic parameters can be identified by the client entity, such as via a client-managed server, by analyzing words and/or tones of voice communications previously received by the plurality of remotely-situated client entities. The plurality of speech characteristic parameters can be correlated with a particular context, as discussed herein.

In various example embodiments, thresholds identified via the client entity, such as via a client-managed server, can delineate ranges for a plurality of contexts. In such example embodiments, the context can be represented by a numerical value indicative of an overall sentiment of the data communications, determined by at least one of a frequency of audio of the data communications, a wavelength or velocity of the data communications, an amplitude of the data communications, and topics of the data communications.

In an additional embodiment, an apparatus including a client-specific communications server and a management circuit can determine and provide an aggregated context for user-data communications involving the client entity. In such embodiments, the client-specific communications server can be configured and arranged to route data communications for a plurality of end-users having respective data communication devices. The client-specific communications server can also be configured and arranged to interface with a data-center communications server providing data communications services to a plurality of remotely-situated client entities on a subscription basis, where each client entity is respectively configured and arranged to interface with the data-center communications server.

The management circuit, as discussed herein, can be configured and arranged to interface with the client-specific communications server and to store context information from a plurality of interconnected data communications systems. The management circuit can be a module associated with a client-specific database and/or a plurality of client-specific databases. Each of the data communications systems can provide at least one of the data communications services to the client entity. In such exemplary embodiments, the client-specific communications server is configured and arranged to determine a context for aggregated user-data communications involving the client entity, by providing user-data communications sessions each involving a client-specific endpoint device and another participating endpoint device during a first time period, where the client-specific endpoint device is associated with the client entity. In various embodiments, the client-specific communications server can determine identifiable aspects of each of the plurality of user-data communications. The identifiable aspects can be aggregated, such that a context for the plurality of user-data communications can be determined. Based on a comparison of the aggregated identifiable aspects and the context information stored in the client-specific database, a context for the plurality of user-data communications (e.g., the aggregated communications) can be identified. Subsequently, the user-data communications server can provide to the client-specific endpoint device, aggregated context information of the user-data communications between the client-specific endpoint device and the other participating endpoint device, where the aggregated context information includes an indication of the context for each respective user-data communication.

In various embodiments, the client-specific communications server is configured and arranged to determine a context for each user-data communication and/or the aggregated user-data communications by identifying key words in the user-data communication(s). The key words can be identified by analyzing the natural language of the user-data communication(s). Using natural language processing or other word recognition means, the client-specific communications server can determine at least one topic of the user-data communication, and assign a context to the received user-data communication based at least in part on the identified key words.

The speech characteristic parameters can include a tone of the user-data communication, where the tone includes measurable audio parameters such as a frequency of audio in the user-data communication, a wavelength or velocity of the audio in the user-data communication, an amplitude of the audio in the user-data communication, and a combination thereof. In such embodiments, the client-specific communications server can be configured and arranged to determine the context for the user-data communication by identifying the tone of the user-data communication.

As described herein, once the aggregated context for user-data communications between the client entity and the other party is determined, the client-specific communications server can cause the display of the aggregated context information on a graphical user interface. For instance, the client-specific communications server can cause the disparate-system data room to be displayed on a graphical user interface of the client-specific endpoint device. In various embodiments, the disparate-system data room (also referred to herein as a virtual room) can be provided to a number of different users. As an illustration, each end-user of the remotely-situated client entity can be provided access to the virtual room. It may be desirable to control access to the virtual room in some manner, and accordingly, access to the virtual room can be provided to end-users of the remotely-situated client entity in a tiered manner, such that portions of the aggregated context information are not provided to a subset of the end-users of the remotely-situated client entity. As such, managers and/or other supervisory personnel can view the aggregated context information in order to effectively manage client relationships, whereas end-users that are not in a managerial role are not provided access to the aggregated context information. Examples are not so limited, however, and each client entity can specify a manner in which the disparate-system data room is provided to and/or accessed by end-users of the client entity. Moreover, each respective client entity can specify the content that is displayed in the disparate-system data room.

The client-specific communications server can provide end-users of the client entity, access to the disparate-system data room (e.g., virtual room). For each of the plurality of disparate interconnected data communications systems, the disparate-system data room can provide a summary of the user-data communications between the client entity (e.g., a client-specific endpoint device) and the other party (e.g., another participating endpoint device) during a particular period of time. Similarly, the disparate-system data room can provide the determined context for each respective user-data communication. Additionally and/or alternatively, the disparate-system data room can display an event timeline (e.g., a contextual timeline of events) of the user-data communications between the client entity and the other party during the particular period of time.

In a further particular embodiment, an apparatus including a data-center communications server and a management circuit can determine and provide an aggregated context for user-data communications involving the client entity. In such embodiments, the management circuit can maintain a client-specific database which correlates identifiable aspects (e.g., communications-specific characteristics) of user-data communications involving at least one client entity among the plurality of remotely-situated client entities with a particular context.

In such embodiments, the data-center communications server is configured and arranged to determine and provide aggregated context information for user-data communications involving the client entity. The data-center communications server can retrieve from a plurality of disparate interconnected data communications systems, a plurality of user-data communications between the client entity and another party. Further, the data-center communications server can determine identifiable aspects of each of the plurality of user-data communications and aggregate the identifiable aspects of the plurality of user-data communications.

The context for the plurality of user-data communications can be determined by the data-center communications server based on a comparison of the aggregated identifiable aspects and the context information stored in the client-specific database. Subsequently, the data-center communications server can provide to the client entity, access to the virtual room including the context information of the plurality of user-data communications. In various embodiments, the data-center communications server can determine the context for user-data communications for each respective client entity, based on client-specific preferences provided by the respective client entity. Each client entity may have different criteria for assigning a context to a particular communication. Differences in language, dialect, mannerisms, and/or business industry may alter how particular contexts would be assigned to a particular correspondence. Accordingly, the data-center communications server can provide a basic set of context information to each respective client entity (e.g., a basic set of criteria for determining a context for various user-data communications) and each client entity can supplement the basic information with client-specific context information for correlating identifiable aspects of user-data communications with a particular context. In such a manner, each client entity can have a customized set of criteria for assigning a particular context to various user-data communications.

In various embodiments, the criteria for assigning a particular context to a user-data communication and/or user-data communications may be dynamic and based at least in part on user feedback. For instance, the identifiable aspects of the user-data communications can include a keyword, a tone, and/or a phrase. The data-center communications server can be configured and arranged to determine a context for aggregated user-data communications involving the client entity, by receiving from an end-user associated with the client entity, feedback indicating an extent to which the determined context is accurate. As an illustration, the user may be asked for feedback regarding whether the keywords, tones, and/or phrases identified accurately capture the sentiment of the plurality of user-data communications. Based on the user feedback, the client-specific database for the associated client entity can be updated. Additionally and/or alternatively, the data-center communications server can be configured and arranged to provide to each respective client entity, an option to specify a manner in which a context is assigned to a user-data communication and/or user-data communications. For instance, client entities can specify aspects (e.g., keywords, phrases, topics, tones, etc.) that can be identified from user-data communications directed to the respective client entity, and a context associated each of the identifiable aspects. Similarly, the data-center communications server can be configured and arranged to provide to each respective client entity, an option to specify handling processes for handling user-data communications between the client entity and the other party in response to the context for the plurality of user-data communications meeting predefined client-specific criteria.

At least one machine learning-based algorithm can assist in the effective and efficient context aggregation in a data communications network. For instance, previous communications between parties can be scaled and/or correlated with a particular context. After the completion of a communication, feedback can be obtained from the communicating parties, which assists in the determination of the overall context of the completed communication. Aspects of the completed communication can then be compared to subsequent communications in order to identify the context of the subsequent communications. New (e.g., subsequent) data-communications can be compared against the previous communications to determine a likely context of the new data-communication.

Various processes can be implemented to determine a context for a particular user-data communication. For instance, the context of the aggregated user-data communications can be based on the topic of the user-data communications, a sentiment of the user-data communications, and/or an identification of an individual or organization which originated the user-data communications, among others. In various embodiments, the context of the aggregated user-data communications can be identified based on previous communications and/or previous interactions with a particular customer. As such, the processing resource communicatively coupled to the data-communications server can be configured and arranged to access customer relationship management (CRM) data, and communications services accessed by the plurality of remotely-situated client entities, the communications services including an email system and a text-based chat system. A context of the voice communication can be identified based on the CRM data, information in the email system, or information in the text-based chat system. Various handling processes can be implemented in response to the context of a particular user-data communication or an aggregate of user-data communications meeting or exceeding a particular threshold. As an illustration, in embodiments where the user-data communication is a voice communication, the processing circuit may process the voice communication by interrupting recording of the message and routing the voice communication to a live operator, responsive to a threshold for context being satisfied. Similarly, the processing circuit may process the voice communication by sending a message to a recipient of the voice communication, responsive to a threshold for context being satisfied, and/or send the message to the recipient by email or text message during recording of the message. Additionally and/or alternatively, a selectable option may be provided to answer the voice communication during the recording of the message, responsive to the threshold context being satisfied.

Each such client entity may specify a threshold range for contexts which trigger respective actions by the data-center communications server. Accordingly, a client specific database may store a set of rules associating sentiment scores and criticality scores with various communication handling processes. For instance, one client entity may specify that user-data communications with a context above a particular threshold, should be routed to an agent within the organization. As another illustration, a client entity may specify that user-data communications with a context above a particular threshold, should trigger the generation of a message (in the form of a text message and/or email) to a particular recipient. The manner in which each respective communication is handled may be specified in a client specific database 121. The database may also include customer relationship management data, and context information associated with particular clients among the plurality of remotely-situated client entities.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Turning now to the figures, FIG. 1 illustrates a block diagram of an example system for providing aggregated context information in a data communications network, consistent with the present disclosure. Data communications services can be provided for a plurality of client entities, such as via a data-center communications server. Each client entity can provide the data communications services to various endpoint devices, as can be implemented in a distributed computing environment. For instance, as illustrated in FIG. 1, a data-center communications server can host via cloud 117. A plurality of client entities can access the data-center communications server via the cloud 117, such as by a respective client entity server (e.g., client entity 1 server 101-1, client entity 2 server 101-2, and client entity 3 server 101-3).

Each of the respective client entities can be connected in one or more data networks as discussed further herein. Moreover, each of the respective client entity servers 101-1, 101-2, and 101-3 can be communicatively coupled to a plurality of communications systems. For example, client entity 1 server 101-1 can be communicatively coupled to communications systems 103-1, 103-2, and 103-3. Similarly, client entity 2 server 101-2 can be communicatively coupled to communications systems 105-1, 105-2, and 105-3. Further, client entity 3 server 101-3 can be communicatively coupled to communications systems 107-1, 107-2, and 107-3.

Although not illustrated in FIG. 1, each of the client entity servers can be communicatively coupled to a number of endpoint devices. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by a data-center communications server.

The system illustrated in FIG. 1 further includes one or more processing circuits configured to implement client-specific control engines, which are configured to adjust the data communications provided for each client account according to a respective set of control directives. For instance, the client-specific control engines can adjust a manner in which endpoint devices are controlled, and/or a manner of routing of a data communications for a client account, by accessing client-specific sets of control data stored in at least one client-specific database 121.

The server-based communications system illustrated in FIG. 1 can facilitate providing aggregated context information to client entities, consistent with the present disclosure. In various exemplary embodiments, the context for the aggregated communications can be determined by a data-center communications server. Additionally and/or alternatively, the context for the aggregated communications can be determined by a client managed server. In either situation, at 109, user-data communications sessions each involving a client-specific endpoint device and another participating endpoint device can be provided, where the client-specific endpoint device is associated with a client-entity among a plurality of remotely-situated client entities each respectively configured and arranged to interface with the data communications server. For instance, the data communications server can provide to each of client entity 1, client entity 2, and client entity 3, data communications services as described herein. Subsequently, at 111, user-data communications between the client entity and the other party can be retrieved from a plurality of interconnected data communications systems for a first time period. For instance, if a context between client entity 1 and Sally Sample is to be identified, then user-data communications between client entity 1 and Sally Sample during the first time period can be retrieved from communications systems 103-1, 103-2, and 103-3. As another illustration, if a context between client entity 2 and Sally Sample is to be identified, then user-data communications between client entity 2 and Sally Sample during the first time period can be retrieved from communications systems 105-1, 105-2, and 105-3.

A context can be determined for each respective user-data communication between the client entity and the other party during the first time period, as described herein. The identification of the context of communications during the first time period can assist with the development of the client-specific database 121, and enable machine learning to assign a context to subsequent user-data communications. As such, a plurality of user-data communications between the client entity and the other party can be aggregated at 113. For instance, once the context for previous user-data communications between client entity 1 and Sally Sample are determined (e.g., during the first time period), then user-data communications between client entity 1 and Sally Sample during the second time period can be retrieved from communications systems 103-1, 103-2, and 103-3. Aspects of each user-data communication can be identified, and aggregated at 113. As an illustration, keywords such as "pleased" and "happy" can be identified from an email from Sally, and the phrase "I would like to place another order" can be identified from a transcript of a voice call from Sally. These identified aspects can be combined (e.g., aggregated) to determine an overall context between Sally Sample and client entity 1. As a further illustration, a tone from a voicemail from Sally to client entity 1 can indicate that she was very angry (e.g., the tone of her voice was short and loud), yet keywords from the same voicemail such as "I am very pleased" may be identified. Similarly, product usage records can indicate that Sally has been using her purchased services frequently. Each of these identifiable aspects can be combined (e.g., aggregated) to determine an overall context between Sally Sample and client entity 1.

At 115, the aggregated context information of the user-data communications between the client-specific endpoint device and the other participating endpoint device can be displayed. As described herein, a context can represent an overall sentiment of a relationship between at least two parties. As an illustration, a context can represent a strength of a relationship between a client that has purchased data-communications services (e.g., ABC Company), and a customer of the client (e.g., Sally Sample). The context can be identified based on a number of factors, including keyword, phrase, and/or tone, and can be identified from a single user-data communication between the parties and/or from an aggregate of user-data communications between the parties. In embodiments where the context is determined from an aggregate of user-data communications, projections and/or predictions can be made as to the likely future context between the parties. Additionally and/or alternatively, the context can be displayed for each disparate data communications system, allowing the viewer to assess the context between the two parties in differing communications platforms.

Figure 2:
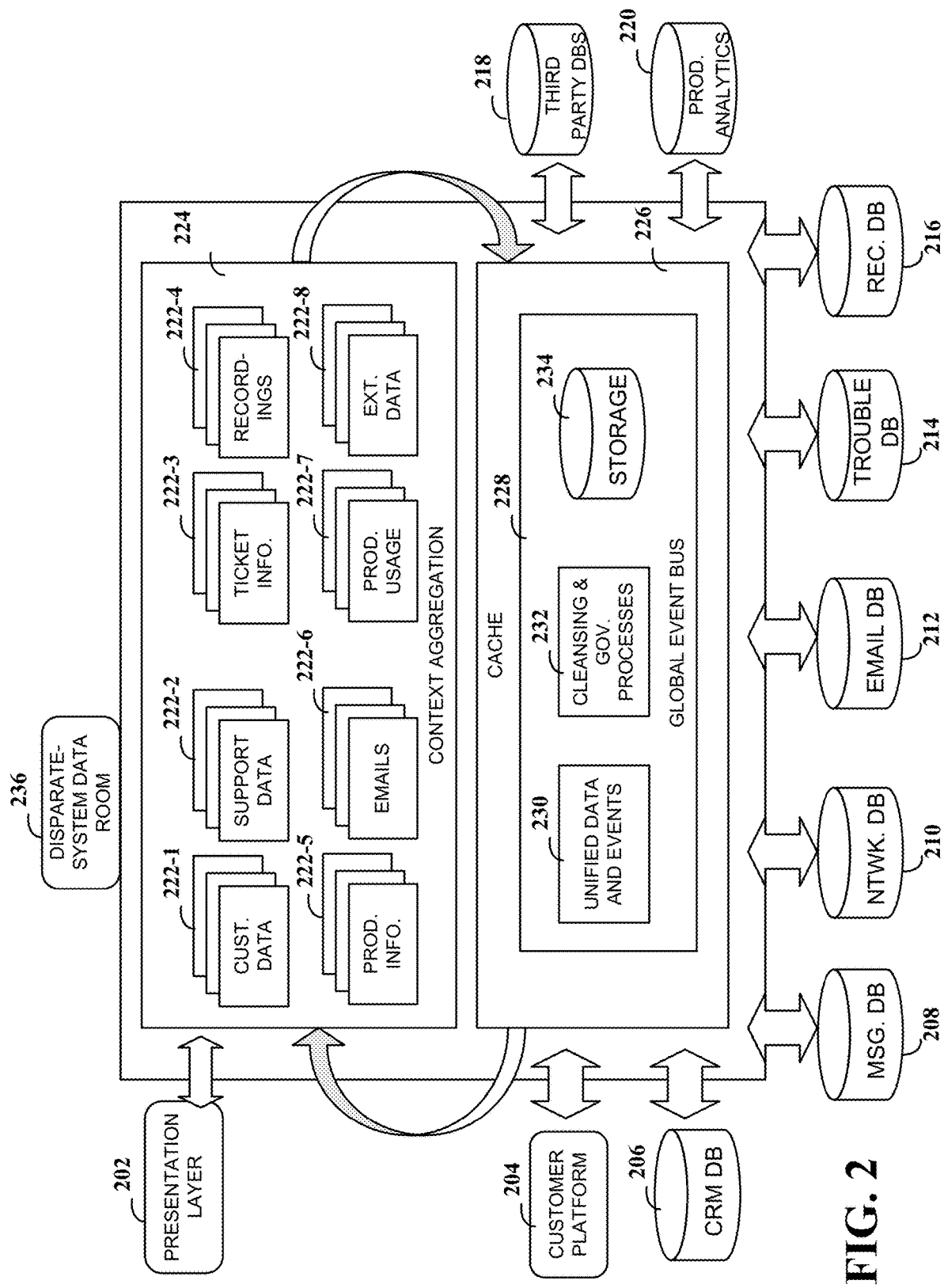
FIG. 2 illustrates a block diagram of an example system of intelligence for context aggregation, consistent with the present disclosure.

FIG. 2 illustrates a block diagram of an example system of intelligence for context aggregation, consistent with the present disclosure. The system of intelligence illustrated in FIG. 2 can be implemented by a data-center communications server hosted by a communications service provider, and/or by a client managed server hosted by a client of the communications service provider.

Data and/or information from a plurality of sources may be aggregated to determine a context between a client entity and another party. As discussed with regards to FIG. 1, each client entity can be associated with a plurality of interconnected data communications systems. For instance, each client entity can be associated with a CRM system, an email communication system, a product sales system, a text-based communications system (e.g., chat), a technological support system, and/or a data monitoring system. Examples are not so limited, and each client entity can be associated with additional and/or different communications systems beyond those listed. Additionally, the client entity and/or the communications service provider can be communicatively coupled to external (e.g., third party) systems and/or databases.

Data and/or information from each of the interconnected data communications systems can be aggregated to identify a context between a client entity and another party. Referring to FIG. 2, a data cache 226 can store real-time information about all interactions involving the client entity (including the other party). For instance, a global event bus 228, stored in cache 226, can identify and record each interaction and/or event involving the client entity. A unified data and events circuit 230 can store the various data and events involving the client entity, such as emails sent and received, phone calls placed and received, chat messages, etc. A cleansing and governance processes circuit 232 can process the unified data and events as appropriate based on the content of the data. For instance, different encryption and/or data handling processes may be implemented for data and events including health data and/or financial data. A storage circuit 234 can store the various events, information regarding cleansing and governance processes, and other information.

In response to an event occurrence, such as transmission or receipt of a user-data communication, the cache 226 can be updated. Particularly, the cache 226 can be updated to include an updated context based on the aggregated communications between the client entity and the other party. For instance, the cache 226 can be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user can be retrieved from each of these databases, and stored for context aggregation, such as by a context aggregation circuit 224. As an illustration, to determine a context between Sally Sample and ABC Company, information pertaining to customer sales and billing for Sally Sample can be retrieved from the CRM database 206, service tickets can be retrieved from troubleshooting database 214, and transcripts of voice calls can be retrieved from the recordings database 216. Similarly, to determine a context between Bob Bradford and ABC Company, information pertaining to customer sales and billing for Bob Bradford can be retrieved from the CRM database 206, service tickets can be retrieved from troubleshooting database 214, and transcripts of voice calls can be retrieved from the recordings database 216.

In various embodiments, data and/or information from each respective database can be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the the email database 212 can be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 can be stored in the context aggregation circuit 224.

Each time that an event occurs involving the client entity and the other party, the cache 226 and context aggregation circuit 224 can be updated. For instance, each time that Sally Sample and ABC Company interact in some way, an event record is stored in the cache 226, and the context aggregation circuit 224 is updated as appropriate. In the instance that Sally Sample purchases a new service or product, a record from the CRM database 206 would update the cache 226, which can in turn update the product information 222-5 for Sally Sample, and in turn update the context between Sally Sample the ABC Company, which can be stored in storage 234. In a subsequent instance, Sally Sample contacts ABC Company by voice and speaks with a customer service representative about a negative experience she had. In this illustration, the recording database 216 can update the cache 226, which can in turn update the recordings data 222-4 for Sally Sample. In turn, the context for Sally Sample and ABC Company can be updated to reflect the negative call, and the updated context can be stored in storage 234.

In various example embodiments, a presentation layer 202 can present the aggregated context in various formats. For example, circuitry configured and arranged to communicate with the system of intelligence illustrated in FIG. 2 (e.g., the cache 226 and the context aggregation circuit 224) can present a graphical user interface on a desktop computing device, mobile computing device, and/or tablet, which visually presents the context between the client entity and the other party. Continuing with the above example, a graphical user interface can present to a representative of ABC Company, a timeline illustrating the context of the relationship between Sally Sample and ABC Company over a period of time, and the events associated with each context at each time point. The presentation layer 202 can further facilitate the presentation of the disparate-system data room 236. The disparate-system data room can include an indication of the context for each respective user-data communication. For instance, the disparate-system data room can include a plurality of display boxes, each associated with a different respective data communications system. Each display box can include information about previous user-data communications involving the client entity and the other party, as well as a representation of the context of the user-data communications. In various embodiments, the disparate-system data room can display the aggregated context between the client entity and the other party, such as in a contextual timeline of events. The contextual timeline of events can include a visual representation of different user-data communications between the client entity and the other party, as well as the context for each respective user-data communication. Additionally and/or alternatively, the contextual timeline of events can include a visual representation of the context for future user-data communications between the client entity and the other party.

Figure 3:
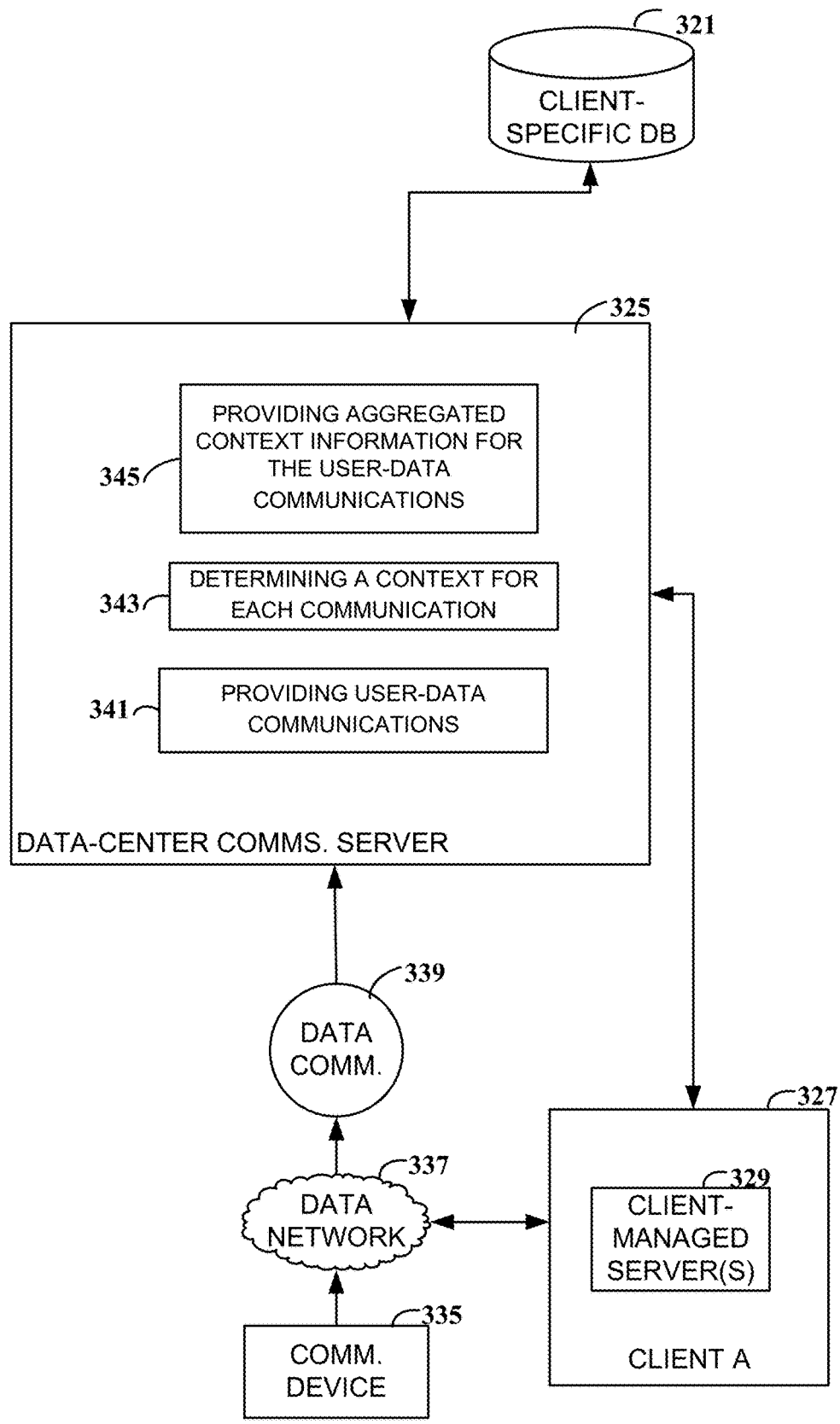
FIG. 3 illustrates a flow diagram illustrating an example method for providing aggregated context information in a data communications network, consistent with embodiments of the present disclosure.

FIG. 3 illustrates a flow diagram illustrating an example method for providing aggregated context information in a data communications network, consistent with embodiments of the present disclosure. For example, a data communications device 335, such as can be used by a customer of a client entity, can send a user-data communication to a client. For instance, customer Jeff Smith can call ABC Company with a question about a product that he purchased. The phone call placed by Jeff Smith (e.g., the user-data communication) can originate from Jeff Smith's device 335. Communications device 335 includes circuitry configured and arranged to facilitate data communications with client A 327, as well as a data-center communications server 325. The user-data communication (e.g., Jeff Smith's phone call) can be communicated to the client (e.g., client A 327), via a data network 337.

The data network can be communicatively coupled to a data-center communications server 325, such as can be provided by a data communications server providing data communications services on a subscription basis. For instance, once the customer begins recording, typing, communicating, and/or generating the data communication 339, the data-center communications server can provide the user-data communications to the client entity at 341. The data-center communications server can also retrieve from a plurality of interconnected data communications systems, a plurality of user-data communications between the client entity and another party, and a context for each of the retrieved user-data communications can be determined at 343. Continuing with the example above, Jeff Smith can call Client A. While Jeff Smith is on the phone with Client A, additional data-communications between Jeff Smith and Client A can be retrieved. For instance, email communications between Jeff Smith and Client A, product sales information, product support information, support ticket information, product usage information, recordings from previous voice communications, and external information associated with Jeff Smith can be retrieved. The context of each such user-data communication can also be identified, as described herein, and the aggregated context information (e.g., the context of each respective user-data communication involving the two parties) can be provided at 345. While the examples provided herein discuss a data communication including a voice call, it is noted that examples are not so limited. The data communication can include non-voice messages as well. Accordingly, the user-data communication can correspond to a user-generated audible communication or a non-voice user-generated communication.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined at 343. The context can correspond with a sentiment of the respective user-data communication. As an illustration keywords and/or phrases identified from email correspondence between Jeff Smith and Client A can be associated with a positive sentiment, indicating that Jeff Smith was happy with a recent purchase. Additionally, recordings from voicemails between Jeff Smith and Client A can include keywords and a tone indicating that Jeff Smith was happy with a customer service experience. Additional data including product usage analytics can indicate that Jeff is using his purchased products extensively, and has recently purchased additional services to accompany his existing services.

The identifiable aspects of the plurality of user-data communications and/or the context from each respective user-data communication can be aggregated at 345 such that a context can be assigned to the relationship between Jeff Smith and Client A. Continuing with the above example, a context can be assigned to the relationship, indicating that the relationship is strong and positive, and Jeff has had an overall positive experience with Client A. Additionally and/or alternatively, the context for each respective communication may be presented to the end-user independently.

In various embodiments, the context for the plurality of user-data communications (e.g., the aggregated user-data communications) can be determined, such as based on a comparison of the aggregated identifiable aspects and context information stored in a client-specific database 321. The data-center communications server 325 can serve a number of different client entities, and each respective client entity can specify different conditions under which a particular context would be assigned to a particular relationship. For instance, Client A 327 can be located in one country where a particular set of keywords are considered defamatory, whereas Client B (not illustrated in FIG. 3) can be located in a different country where the same set of keywords are not considered defamatory. Accordingly, a different set of conditions to associate particular contexts to user-data communications can be used by different client entities, and the associations between different identifiable aspects and contexts can be stored in a client-specific database such as database 321. As such, the data-center communications server 325 can be configured and arranged to provide to each respective client entity, an option to specify a plurality of identifiable aspects that can be identified from user-data communications, and at least one context associated each of the plurality of identifiable aspects.

Figure 4:
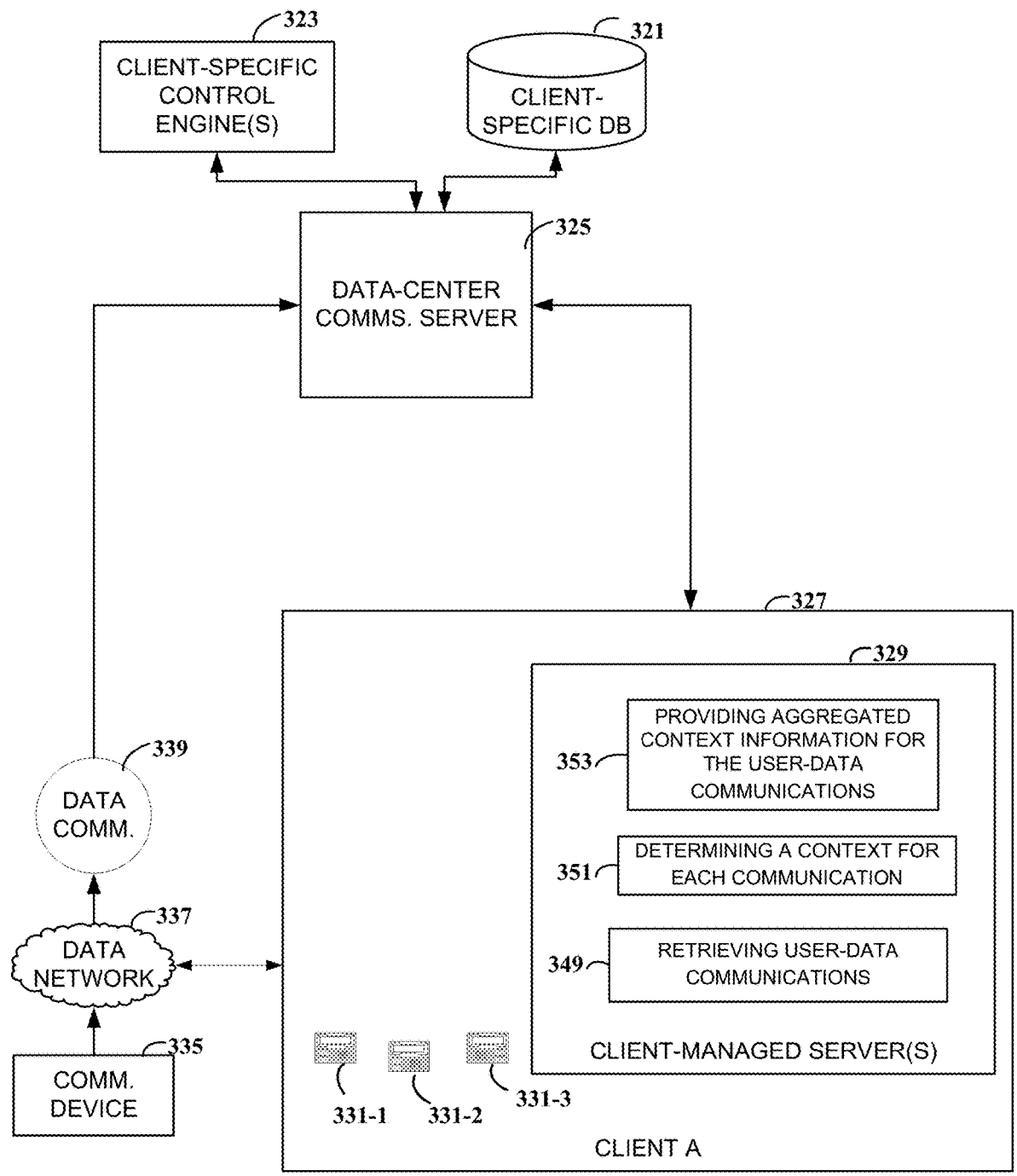
FIG. 4 illustrates an additional flow diagram illustrating an example method for providing aggregated context information in a data communications network, consistent with embodiments of the present disclosure.

FIG. 4 illustrates an additional flow diagram illustrating an example method for providing aggregated context information in a data communications network, consistent with embodiments of the present disclosure. For example, a data communications device 335, such as can be used by a customer of a client entity, can send a user-data communication to a client. For instance, customer Jeff Smith can call ABC Company with a question about a product that he purchased. The phone call placed by Jeff Smith (e.g., the user-data communication) can originate from Jeff Smith's device 335. Communications device 335 includes circuitry configured and arranged to facilitate data communications with client A 327, as well as a data-center communications server 325. The user-data communication (e.g., Jeff Smith's phone call) can be communicated to the client (e.g., client A 327), via a data network 337. The data network can be communicatively coupled to a data-center communications server 325, such as can be provided by a data communications server providing data communications services on a subscription basis. In various embodiments, the data-center communications server 325 can display the aggregated context between the client entity and the other party, such as in a contextual timeline of events. The contextual timeline of events can include a visual representation of different user-data communications between the client entity and the other party, as well as the context for each respective user-data communication. Additionally and/or alternatively, the contextual timeline of events can include a visual representation of the context for future user-data communications between the client entity and the other party.

Once the customer (e.g., Jeff Smith) begins recording, typing, communicating, and/or generating the data communication 339, the client-managed server 329 can determine a context for aggregated user-data communications involving a client entity. For instance, at 349, the client-managed server 329 can retrieve from a plurality of interconnected data communications systems, a plurality of user-data communications between the client entity and another party. Continuing with the example above, Jeff Smith can call Client A. While Jeff Smith is on the phone with Client A, additional data-communications between Jeff Smith and Client A can be retrieved via client-managed server 329. For instance, support tickets associated with Jeff Smith, recordings of phone calls from Jeff Smith, emails from Jeff Smith, and/or external information associated with Jeff Smith can be retrieved.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined at 351. The context can correspond with a sentiment of the respective user-data communication. As an illustration keywords and/or phrases identified from email correspondence between Jeff Smith and Client A can be associated with a positive sentiment, indicating that Jeff Smith was happy with a recent purchase. Additionally, recordings from voicemails between Jeff Smith and Client A can include keywords and a tone indicating that Jeff Smith was happy with a customer service experience. Additional data including product usage analytics can indicate that Jeff is using his purchased products extensively, and has recently purchased additional services to accompany his existing services.

The identifiable aspects of the plurality of user-data communications and/or the context from each respective user-data communication can be aggregated such that a context can be assigned to the relationship between Jeff Smith and Client A. Continuing with the above example, a context can be assigned to the relationship, indicating that the relationship is strong and positive, and Jeff Smith has had an overall positive experience with Client A.

At 353, the aggregated context information can be provided to end-users. In some example embodiments, the context can be represented by a number, for instance ranging from 1 to 10 where 1 indicates that the relationship between Jeff Smith and Client A is in poor health, and 10 indicates that the relationship between Jeff Smith and Client A is in good health. As another illustration, the context can be represented by a color. For instance, the color red can indicate that the relationship between Jeff Smith and Client A is in poor health, the color brown can indicate that the relationship between Jeff Smith and Client A is in slightly poor health, the color orange can indicate that the relationship between Jeff Smith and Client A is in acceptable health, the color yellow can indicate that the relationship between Jeff Smith and Client A is in slightly good health and the color green can indicate that the relationship between Jeff Smith and Client A is in good health.

In various example embodiments, the context can be dynamic and/or represented by a timeline of contexts. For instance, a series of interactions and/or user-data communications between Jeff Smith and Client A can be mapped on a timeline. An outage of Jeff's service can be represented in the timeline at a first point, and a context of red (or 1) can be illustrated at the point in time of the outage, indicating that at that point, the context of the relationship was bad. An email from Jeff Smith to Client A at a second point discussing the service outage can also be represented in the timeline, and a context of red (or 1) can be illustrated at the point in time of the outage, indicating that at that point, the context of the relationship was still bad. Subsequently, a service cloud ticket can be represented in the timeline at a third point, and a context of orange (or 5) can be illustrated at the third point, indicating that the context of the relationship is acceptable. At a fourth point in the timeline, a call between Jeff Smith and Client A can be represented, corresponding with a context of red (or 1), indicating that at that point, the context of the relationship was again bad. At a fifth point in the timeline, an email between Jeff Smith and Client A (e.g., such a representative of Client A) can be represented, corresponding with a context of yellow (or 7), indicating that at that point, the context of the relationship was slightly good at the time of the email. At a sixth point in the timeline, a call between Jeff Smith and Client A (e.g., such a representative of Client A) can be represented, corresponding with a context of orange (or 5), indicating that the context of the relationship is acceptable at the time of the call. At a seventh point in the timeline, a meeting between Jeff Smith and Client A (e.g., such a representative of Client A) can be represented, corresponding with a context of orange (or 5), indicating that the context of the relationship is still acceptable at the time of the meeting. At an eighth point in the timeline, a voicemail received from Jeff Smith by Client A (e.g., such a representative of Client A) can be represented, corresponding with a context of brown (or 2), indicating that the context of the relationship is slightly poor health at the time of the voicemail.

In some example embodiments, the context between the client entity and the other party can be situational. As an illustration, the context between the client entity and the other party can be good, although the context between the client entity and the other party can be poor on a particular project and/or when particular individuals interact. For instance, the context between Jeff Smith and Client A can be good, though the context between Jeff Smith and Sally Sanders, an employee of Client A can be poor. As another illustration, the context between Jeff Smith and Client A can be good, though the context between Jeff Smith and Client A with regards to Project Purple can be acceptable.

In various embodiments, the plurality of user-data communications can be aggregated, and the context for the plurality of user-data communications (e.g., the aggregated user-data communications) can be determined, based on a comparison of the aggregated identifiable aspects and context information stored in a client-specific database 321. The data-center communications server 325 can serve a number of different client entities, and each respective client entity can specify different conditions under which a particular context would be assigned to a particular relationship, as discussed with regards to FIG. 3.

Figure 5:
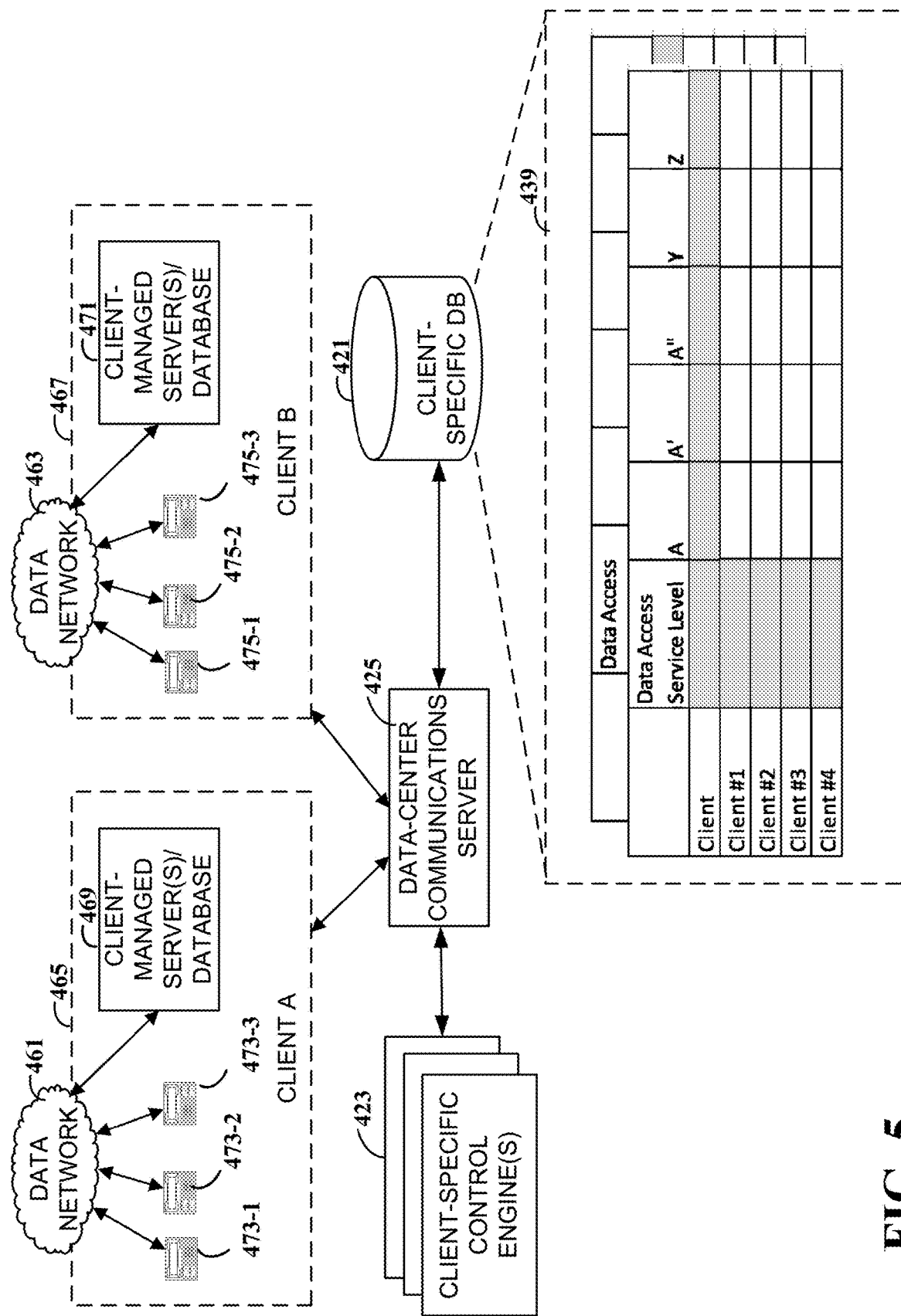
FIG. 5 illustrates a block diagram of an example data communications system for context aggregation, consistent with the present disclosure.

FIG. 5 illustrates a block diagram of an example data communications system for client-specific data communications monitoring, consistent with the present disclosure. The system includes a data-center communications server 425 configured to provide data communications for a plurality of endpoint devices 473-1, 473-2, 473-3, 475-1, 475-2, 475-3 connected in one or more data networks 461 and 463. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by the data-center communications server 425. In this example, endpoint devices 473-1, 473-2, and 473-3 are associated with an account 465 for a first client A and endpoint devices 475-1, 475-2, and 475-3 are associated with an account 467 for a second client B.

The system includes one or more processing circuits configured to implement client-specific control engines 423, which are configured to adjust the data communications provided for each client account according to a respective set of control directives. For instance, the client-specific control engines 423 can adjust a manner in which endpoint devices 473-1, 473-2, 473-3, 475-1, 475-2, and 475-3 are controlled, and/or a manner of routing of a data communications for a client account, by generating client-specific sets of control data to the data-center communications server 425. For example, the client-specific control engines 423 can generate client-specific sets of control data by processing the respective set of control directives for the account in response to communication event data or other data prompts received from the data-center communications server 425.

As previously described, client-specific control engines 423 can be used to facilitate control of endpoint devices associated with a client device. The control of the endpoint devices can be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, virtual computing environments. One or more of such virtual office features can be provided, for example, by a cloud computing network having one or more servers configurable to provide a data communications system for a plurality of clients.

Each respective client entity can have a client-managed server and/or database. For instance, client A 465 can be associated with a client managed server or database 469, whereas client B 467 can be associated with a client managed server or database 471. The client-managed server can facilitate the routing of data communications between the respective endpoint devices and the data-center communications server. Similarly, the client-managed servers can, in some example embodiments, analyze the sentiment and criticality of communications sent to and/or received by the respective endpoint devices, as discussed herein. In some example embodiments, each respective client entity can have a database storing client-specific preferences correlating different sentiment scores and criticality scores with different handling processes.

Additionally and/or alternatively, the data-center communications server 425 can be communicatively coupled with a client specific database 421, storing service level subscriptions 439 for each of a plurality of client entities. For example, the data communications service provider can provide a plurality of different service levels for the clients. Each disparate service level can provide additional services and/or information to the client entity, relative to past communications handled and subsequent communications to be handled by the service provider. For example, Client A 465 and Client B 467 can be associated with a home improvement store and an adhesives manufacturer, respectively. Service level A, which can be offered to both Client A and Client B, can be associated with routing communications for Client A and Client B, and also providing information to the clients regarding customer purchase data. The purchase data can include information about how many products were purchased, when they were purchased, which products were associated with problems and/or an increased number of customer complaints, and the like. Similarly, a second service level (e.g., service level A') can include the services of the first service level (e.g., service level A) but also information on venue and regional demographics. For instance, Service level A', which can be offered to both Client A and Client B, can be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") can include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) can be specified. Each respective client entity (e.g., client #1 through client #4) can have a specified level of data service access provided by the data-center communications server 425.

Figure 6:
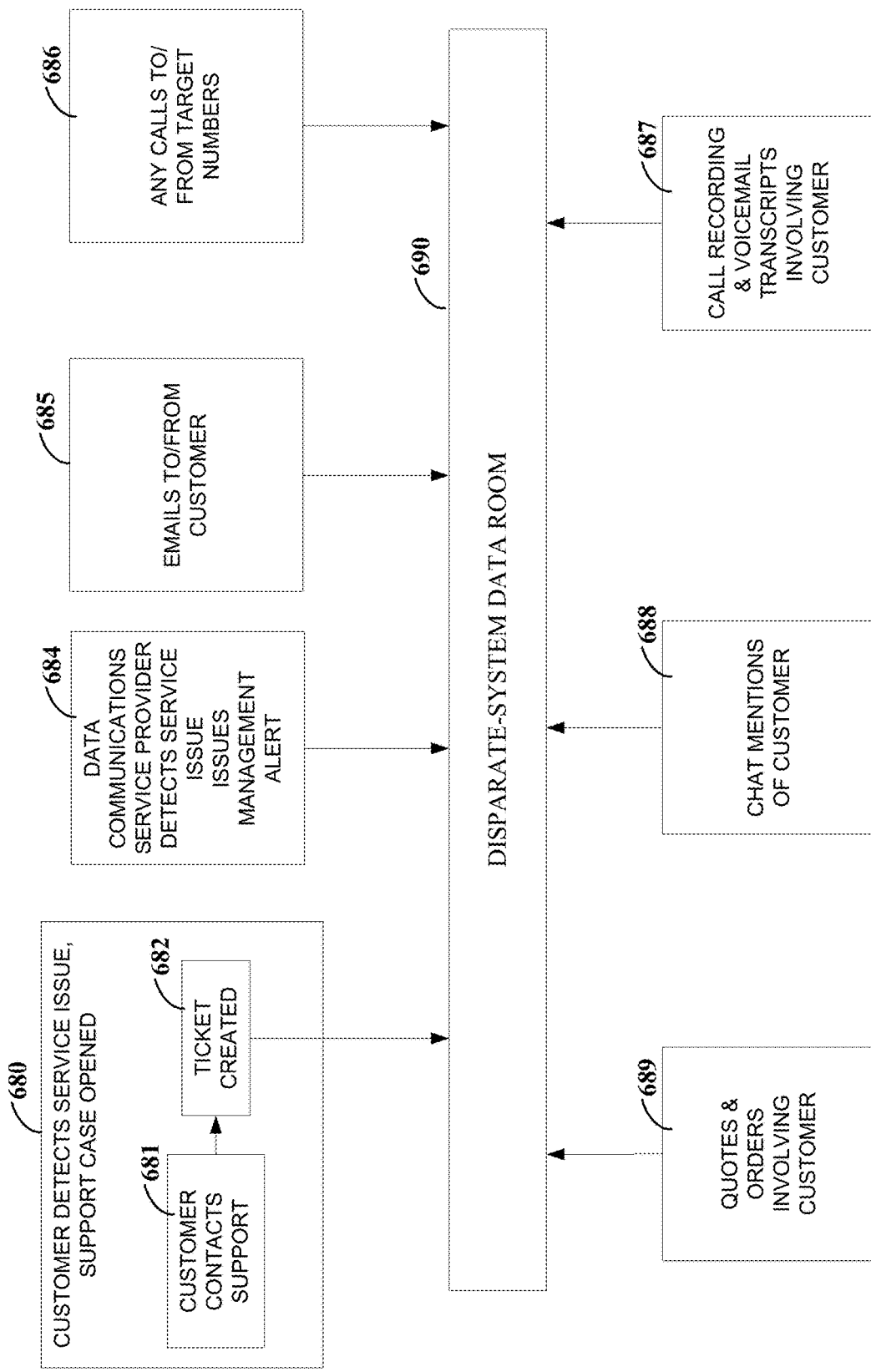
FIG. 6 illustrates an example flow diagram for providing a disparate system data room, consistent with embodiments of the present disclosure.

FIG. 6 illustrates an example flow diagram for providing a disparate system data room, consistent with embodiments of the present disclosure. As illustrated in FIG. 6, a number of different data-communications systems can provide information for display in the disparate system data room 690. For instance, at 680, if a customer contacts the support system a client entity at 681 and reports a service issue, a support case can be opened and a ticket can be created at 682. A representation of the service issue and ticket created can be presented in the disparate-system data room, including a context of the associated support case. Additionally, in some embodiments the data communications service provider can detect an issue at 684, and issue a management alert, which can similarly be represented in the disparate system data room 690. At 685, emails to and/or from the customer can be represented in the disparate system data room 690, and at 686, any calls to and/or from the customer can be represented in the disparate system data room 690. Moreover, at 687, call recordings and voicemail transcripts involving the customer can be represented in the disparate system data room 690. At 688, any chat mentions of the customer, such as may be identified in chat records of the client entity, can be represented in the disparate system data room 690, and at 689, any quotes and/or orders involving the customer can be represented in the disparate system data room 690. In such a manner, information from a plurality of different data communications systems can be aggregated and displayed in the disparate system data room 690, along with the determined context for each respective communication.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. In a communications system involving a data communications server and a client-managed server, a method comprising:
the data communications server operating to:
provide data routing via user-data communications sessions each involving at least one client-specific endpoint device and another participating endpoint device, the at least one client-specific endpoint device being associated with a client-entity among a plurality of remotely-situated client entities each respectively to interface with the data communications server;
retrieve from a plurality of disparate interconnected data communications systems, data corresponding to respective user-data communications occurring between the at least one client-specific endpoint device and the other participating endpoint device during a first time period, each of the data communications systems to provide at least one data communications service to the client entity on a subscription basis;
aggregate context information for each of the respective user-data communications as retrieved from respective ones of the plurality of disparate interconnected data communications systems during the first time period, wherein the context corresponds to at least one communications-specific characteristic; and
in a subsequent second time period while the data communications server is operating to facilitate a communication involving the at least one client-specific endpoint device and the other participating endpoint device,
detect an issue relating to the other participating endpoint device, and
display in a disparate-system data room, the aggregated context information, an indication of the detected issue, and an indication of the context of the user-data communications.

2. The method of claim 1, including the data communications server operating to determine a context for the aggregated context information based on a comparison of identifiable aspects of the aggregated context information and context information stored in a client-specific database, wherein the plurality of disparate interconnected data communications systems are from among different types of systems respectively providing different types of services which are from among the following: a chat-messaging service, an email exchange service, and a VoIP (voice over Internet protocol) service.

3. The method of claim 1, including the data communications server operating to:
identify at least one of a keyword, a phrase, and a tone for each respective user-data communication between the at least one client-specific endpoint device and the other participating endpoint device during the first time period; and
determine a context for each respective user-data communication between the at least one client-specific endpoint device and the other participating endpoint device during the first time period based on the at least one keyword, phrase, and tone.

4. The method of claim 1, including the data communications server operating to:
cause the at least one client-specific endpoint device to display certain data of the disparate-system data room including the aggregated context information on a graphical user interface of the at least one client-specific endpoint device, wherein for each of the respective ones of the plurality of disparate interconnected data communications systems, the certain data includes an indication of at least one of the user-data communications used for the aggregated context information.

5. The method of claim 1, including the data communications server operating to:
cause the at least one client-specific endpoint device to display the disparate-system data room including the aggregated context information on a graphical user interface of the at least one client-specific endpoint device;
identify at least one of a keyword, a phrase, and a tone for user-data communications between the at least one client-specific endpoint device and the other participating endpoint device during the second subsequent time period;
determine a context for each respective user-data communication between the at least one client-specific endpoint device and the other participating endpoint device during the second time period; and
cause the at least one client-specific endpoint device to display in real-time, the aggregated context information on the graphical user interface of at least one the client-specific endpoint device, including the context for the user-data communications during the second time period.

6. The method of claim 1, wherein at least a plurality of the provided user-data communications sessions involve Voice over Internet Protocol (VoIP) communications and further including transcribing the VoIP communications before context information for each respective user-data communication is to be aggregated, and wherein the communications-specific characteristic includes at least one of a keyword, a phrase, and a tone, including the data communications server operating to use artificial intelligence to associate the communications-specific characteristic with a context representative of the user-data communications between the at least one client-specific endpoint device and the other participating endpoint device.

7. The method of claim 1, wherein each of the plurality of disparate interconnected data communications systems includes circuitry configured and arranged to communicate the user-data communications as part of two or more of:
a customer relation management system;
an email communication system;
a product sales system;
a text-based communications system;
a voice-based communications system;
a technological support system; and
a data monitoring system.

8. An apparatus, comprising:
a client-specific communications server to route data communications for a plurality of end-users having respective data communication devices, and to interface with a data-center communications server providing data communications services to a plurality of remotely-situated client entities on a subscription basis, each client entity respectively configured and arranged to interface with the data-center communications server;

a management circuit to interface with the client-specific communications server and to store context information from a plurality of disparate interconnected data communications systems, wherein each of the data communications systems provide at least one of the data communications services to a client entity from among the plurality of remotely-situated client entities; and wherein the client-specific communications server is to provide aggregated context information for data communications between the data-center communications server and the client-specific communications server, by:

providing user-data communications sessions each involving at least one client-specific endpoint device and another participating endpoint device during a first time period, wherein the at least one client-specific endpoint device is associated with the client entity;

determining a context for each respective user-data communication between the at least one client-specific endpoint device and the other participating endpoint device, as carried out via different ones of the plurality of disparate interconnected data communications systems during a first time period; and providing to the at least one client-specific endpoint device, aggregated context information of the user-data communications occurring between the at least one client-specific endpoint device and the other participating endpoint device during the first time period, the aggregated context information including an indication of the context for each respective user-data communication.

9. The apparatus of claim 8, wherein the plurality of disparate interconnected data communications systems include circuitry configured and arranged to communicate the user-data communications as part of two or more of a customer relation management system, an email communication system, and a product sales system, and the context for each respective user-data communication is determined based on at least one of a keyword, a phrase, and a tone identified in the respective user-data communication.

10. The apparatus of claim 8, wherein the plurality of disparate interconnected data communications systems include circuitry configured and arranged to communicate the user-data communications as part of two or more of a text-based communications system, a voice-based communications system, and a technological support system, and the context for each respective user-data communication is determined based on at least one of a keyword, a phrase, and a tone identified in the respective user-data communication.

11. The apparatus of claim 8, wherein the plurality of disparate interconnected data communications systems include circuitry configured and arranged to communicate the user-data communications as part of two or more of a data monitoring system, and external data sources associated with at least one of the client entity and the other party, and the context for each respective user-data communication is determined based on at least one of a keyword, a phrase, and a tone identified in the respective user-data communication.

12. The apparatus of claim 8, wherein the client-specific communications server is configured and arranged to cause the at least one client-specific endpoint device to display the aggregated context information on a graphical user interface of the at least one client-specific endpoint device.

13. The apparatus of claim 8, wherein the client-specific communications server is configured and arranged to provide aggregated context information for data communications between the data-center communications server and the client-specific communications server, by:

identifying at least one of a keyword, a phrase, and a tone for user-data communications between the at least one client-specific endpoint device and the other participating endpoint device during the first time period and a second different time period subsequent the first time period;

determining the context for each respective user-data communication between the at least one client-specific endpoint device and the other participating endpoint device during the first time period and the second time period; and causing the at least one client-specific endpoint device to display in real-time, the aggregated context information on a graphical user interface of the at least one client-specific endpoint device, including the context for the user-data communications during the first time period and the second time period.

14. The apparatus of claim 8, wherein the client-specific communications server is configured and arranged to provide aggregated context information for data communications between the data-center communications server and the client-specific communications server, by:

providing for each end-user of the client entity, access to a virtual room including the aggregated context information of the user-data communications between the at least one client-specific endpoint device and the other participating endpoint device during the first time period.

15. The apparatus of claim 14, wherein access to the virtual room is provided to end-users of the client entity in a tiered manner, such that portions of the aggregated context information are not provided to a subset of the end-users of the remotely-situated client entity.

16. The apparatus of claim 8, wherein the client-specific communications server is configured and arranged to provide aggregated context information for data communications between the data-center communications server and the client-specific communications server, by:

providing end-users of the remotely-situated client entity, access to a virtual room including for each of the plurality of disparate interconnected data communications systems:

a summary of the user-data communications between the client-specific endpoint device and the other participating endpoint device during the first time period; and the determined context for each respective user-data communication.

17. The apparatus of claim 8, wherein the client-specific communications server is to provide aggregated context information for data communications between the data-center communications server and the client-specific communications server, by:

providing end-users of the client entity, access to a virtual room displaying an event timeline of the user-data communications between the client-specific endpoint device and the other participating endpoint device during the first time period, and the determined context of each respective user-data communication.

* * * * *